L. B. PIERSON.
UNLOADING AND FEEDING APPARATUS.
APPLICATION FILED SEPT. 11, 1918.
1,318,914.
Patented Oct. 14, 1919.
2 SHEETS—SHEET 1.
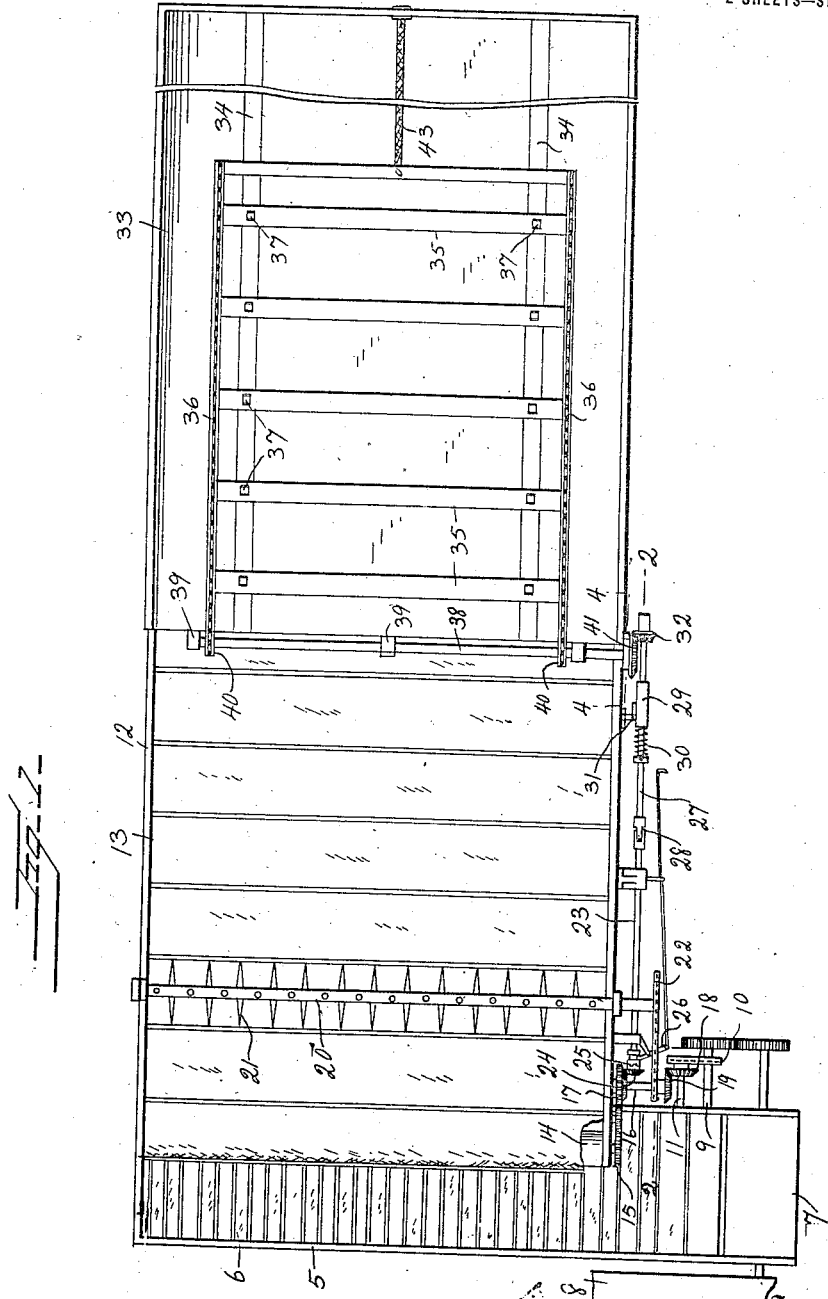
Inventor
L. B. Pierson
By Watson E. Coleman
Attorney

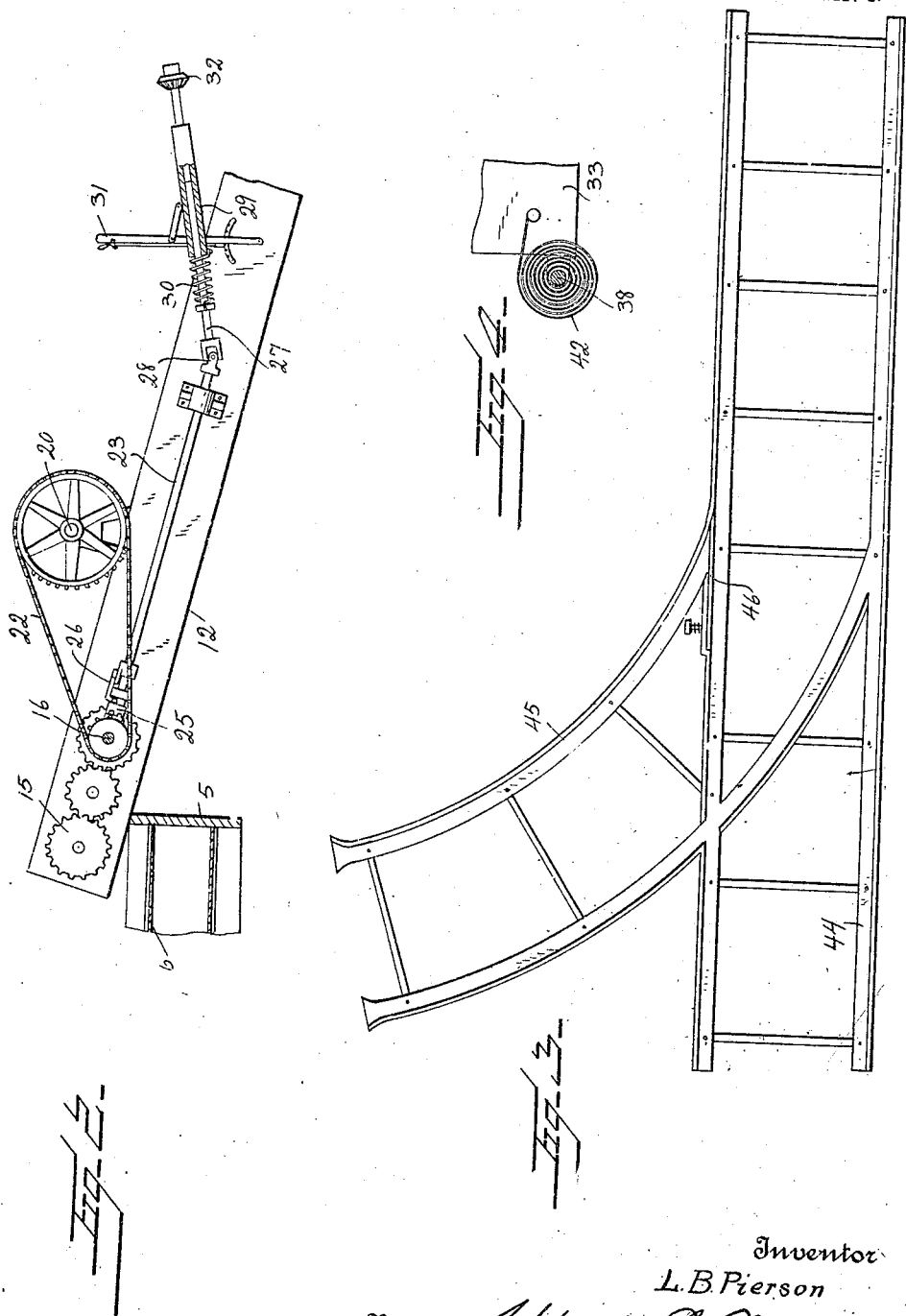

UNITED STATES PATENT OFFICE.

LUDVIG B. PIERSON, OF BISHOP, TEXAS.

UNLOADING AND FEEDING APPARATUS.

1,318,914.   Specification of Letters Patent.   Patented Oct. 14, 1919.

Application filed September 11, 1918. Serial No. 253,588.

*To all whom it may concern:*

Be it known that I, LUDVIG B. PIERSON, a citizen of the United States, residing at Bishop, in the county of Nueces and State of Texas, have invented certain new and useful Improvements in Unloading and Feeding Apparatus, of which the following is a specification, reference being had to the accompanying drawings.

This invention relates to an improved unloading and feeding apparatus, and has for its primary object to provide means for facilitating the handling of fodder after harvesting and feeding the same to an ensilage cutter to thereby obviate the necessity of manually handling the material.

It is a more particular object of the invention to provide, in combination with a transporting vehicle having a movable load carrier, a feeding apron and operating gearing therefor, and means for coupling the operating gearing to the load carrier of the vehicle to move the carrier and deliver the load therefrom upon the feed apron.

It is one of the detail objects of the invention to provide means for regulating the feed of the material from the apron to the ensilage cutter and preventing choking or clogging of the latter.

It is also a further general object of the invention to provide an apparatus as above characterized which is relatively simple in its construction, serviceable and reliable in practical use, and capable of manufacture at comparatively small cost.

With the above and other objects in view, the invention consists in the improved construction, combination and relative arrangement of the various parts as will be hereinafter more fully described, subsequently claimed and illustrated in the accompanying drawings in which similar reference characters designate corresponding parts throughout the several views, and wherein:—

Figure 1 is a plan view illustrating one embodiment of my invention and showing the load carrier in discharging position with relation to the feed apron;

Fig. 2 is a sectional view taken on the line 2—2 of Fig. 1;

Fig. 3 is a plan view of the guide track for the wagon or vehicle; and

Fig. 4 is a detail section taken on the line 4—4 of Fig. 1.

Referring in detail to the drawings, 5 designates a frame in which a slat conveyer 6 of any suitable construction is mounted. This conveyer feeds corn or other fodder to an ensilage cutter, generally indicated by the numeral 7, which is mounted and arranged in one end of said frame. The cutter is driven from any suitable source of power by the belt 8, and the cutter shaft is geared to the feed roller shaft 9 which is disposed between the rotating cutter cylinder and one end of the conveyer 6. The shaft 9 is in turn connected by a drive chain 10 to a stub shaft 11.

A second frame 12 extends upwardly at an angle of approximately 60° from one side of the frame 5, and in the frame 12, an endless feed apron 13 is supported for movement around rollers 14 mounted in opposite ends of said frame. The upper roller 14 is connected by means of the gearing 15 to a shaft 16, the member of the gear train which is fixed on said shaft also having an annular gear 17 on the end face thereof. The shaft 16 is driven through the medium of the beveled gear 18 on the shaft 11, which meshes with a similar gear 19 on one end of said shaft.

Immediately above the feed apron 13, a transverse shaft 20 is suitably mounted upon the opposite sides of the frame 12 and is provided with a multiplicity of radially projecting teeth or spurs 21 disposed in staggered relation. These teeth engaging the material carried upon the upper stretch of the apron, retard its movement and prevent the material being fed in too great quantity onto the conveyer 6. The shaft 20 is connected at one end by means of the endless chain 22 to the shaft 16.

A longitudinally disposed shaft 23 is mounted upon one side of the frame 12 and a pinion 24 is loosely engaged on the lower end of said shaft and has constant engagement with the annular gear 17. This pinion is provided with suitable clutch teeth for engagement by a shiftable clutch member 25 on the shaft 23. This clutch may be shifted by means of the lever 26 into or out of operative position.

To the upper end of the shaft 23, a second shaft 27 is connected by means of the universal joint 28. Upon this latter shaft, a sleeve 29 is keyed for sliding movement and is yieldingly held against such movement in one direction by the contractile spring 30. A lever 31, mounted upon the frame 12, is connected to the sleeve 29, said lever being capable of a sliding, lateral movement whereby the shaft 27 may be swung outwardly from the side of the frame 12 for a purpose to be later explained. On the upper end of the sleeve 29, a beveled pinion 32 is fixed.

The transporting vehicle or wagon for the fodder, indicated at 33, has longitudinally extending metal straps 34 secured to the body thereof adjacent each side of the vehicle-body and on which travels a movable load carrier. This carrier consists of a plurality of transversely extending metal bars 35 connected at their ends by the link chains 36. In each of the bars 35, rollers 37 are mounted to travel upon the metal straps 34. Upon the rear end of the vehicle body, a shaft 38 is mounted in the bearings 39, and to said shaft, sprocket wheels 40 are fixed for engagement with the respective chains 36. On one side of the shaft 38, a beveled gear 41 is secured and is adapted for meshing engagement with the beveled pinion 32 on the sleeve 29. A heavy, spirally coiled spring 42 is fixed at one of its ends to the gear 41, and has its other end suitably secured to a part of the vehicle body. A wire cable 43 is suitably affixed to the opposed ends of the load carrier and passes above and below the bottom of the vehicle or wagon so that the desired movement of the carrier is assured. As the use of such a cable or its equivalent is well known, it is not believed that a detailed description and illustration thereof is necessary.

A track 44 of the proper gage is provided for use in conjunction with the feed apron 13, said track having a laterally extending curved section 45 connected to the straight track section intermediate of its ends. 46 designates an automatic spring held switch rail which constitutes a section of one of the straight track rails, and admits of the movement of the wagon or vehicle from the curved side section 45 of the track upon the straight track section, but prevents the return movement of the vehicle upon the curved section of the track.

From the foregoing description, the construction and manner of operation of the apparatus will be readily understood. When the fodder is harvested, it is discharged into the transporting vehicle upon the flexible load carrier, which extends the full length of the vehicle body. The trackage above referred to is then laid down beneath the upper end of the inclined apron 13 and extending rearwardly therefrom. The wagon or vehicle is drawn upon the curved section 45 of the track until the rear wheels pass beyond the switch 46. The vehicle is then backed upon the straight track section until its rear end is contiguous to the upper end of the apron 13. The lever 31 is now actuated and the pinion 32 operatively engaged with the beveled gear 42. After the motor or other operating means for the ensilage cutter has been started, the lever 26 is actuated to clutch the gear 24 to the shaft 23. Thus, it will be apparent that in the movement of the conveyer 6, motion is also imparted to the apron 13 in the proper direction and likewise through the medium of the shafts 23 and 27 to the shaft 38. The sprockets 40 on this shaft, coacting with the chains 36, move the load carrier rearwardly so that the load is dumped from the rear end of the vehicle upon the upper stretch of the apron 13. This apron feeds the fodder upwardly and beneath the retarding spurs or fingers 21 on the rotating shaft 20, the fodder being finally discharged from the upper end of the apron upon the conveyer 6, by which it is, in turn, fed to the cutting mechanism where it is divided or comminuted for storage in the silo. In the rotation of the shaft 38, to discharge the load, the spring 42 is placed under tension. Thus, after the load has been discharged and the operator actuates the lever 31 to throw the pinion 24 out of meshing engagement with the gear 41, the spring 42 immediately acts to reverse the movement of the flexible carrier and return it to its normal position in the vehicle body.

The apparatus, as above described, is very efficient and reliable in practical operation, and provides means for handling fodder or other ensilage material with great facility and a minimum of manual labor. The several parts of the apparatus are likewise of relatively simple form and are, therefore, strong and durable and not liable to get out of order. The feeding apron may be of any desired length and width in accordance with the capacity of the ensilage cutter.

I have also herein referred to one form of my invention which I have found to be very satisfactory in practical use, but it is further to be understood that the apparatus is susceptible of many modifications in the form, construction and relative arrangement of the several parts and I, accordingly, reserve the privilege of resorting to all such legitimate changes as may be fairly embodied within the spirit and scope of the invention as claimed.

I claim :—

1. The combination with a transporting vehicle having a movable load carrier, an operating shaft therefor; a structure upon which the movable load carrier is adapted to discharge, a driven shaft carried by the structure, a sleeve slidably mounted upon the driven shaft for operative connection with the operating shaft, said sleeve rotating with the driven shaft, and automatic means for urging the sleeve in a direction longitudinally of the driven shaft to maintain the sleeve in operative connection with the operating shaft.

2. The combination with a transporting vehicle having a movable load carrier, an operating shaft therefor, a structure upon which the movable load carrier is adapted to discharge, a driven shaft carried by the structure, a sleeve slidably mounted upon the driven shaft for operative connection with the operating shaft, said sleeve rotating with the driven shaft, automatic means for urging the sleeve in a direction longitudinally of the driven shaft to maintain the sleeve in operative connection with the operating shaft, and means for moving the sleeve in the opposite direction.

3. The combination with a transporting vehicle having a movable load carrier, an operating shaft therefor; a structure upon which the movable load carrier is adapted to discharge, a driven shaft carried by the structure, a sleeve slidably mounted upon the driven shaft for operative connection with the operating shaft, said sleeve rotating with the driven shaft, automatic means for urging the sleeve in a direction longitudinally of the driven shaft to maintain the sleeve in operative connection with the operating shaft, and manually operable means for moving the shaft in the opposite direction.

4. The combination with a transporting vehicle having a movable load carrier, an operating shaft therefor; a structure upon which the movable load carrier is adapted to discharge, a driven shaft carried by the structure, a sleeve slidably mounted upon the driven shaft for operative connection with the operating shaft, said sleeve rotating with the driven shaft, automatic means for urging the sleeve in a direction longitudinally of the driven shaft to maintain the sleeve in operative connection with the operating shaft, said driven shaft comprising a plurality of sections, and a universal joint connecting adjacent ends of the sections.

5. The combination with a transporting vehicle having a movable load carrier, an operating shaft therefor; a structure upon which the movable load carrier is adapted to discharge, a driven shaft carried by the structure, a sleeve slidably mounted upon the driven shaft for operative connection with the operating shaft, said sleeve rotating with the driven shaft, automatic means for urging the sleeve in a direction longitudinally of the driven shaft to maintain the sleeve in operative connection with the operating shaft, and a lever supported by the structure and connected to the sleeve for manually imparting movement thereto in the opposite direction.

6. The combination with a transporting vehicle having a movable load carrier, an operating shaft therefor; a structure upon which the movable load carrier is adapted to discharge, a driven shaft carried by the structure, a sleeve slidably mounted upon the driven shaft for operative connection with the operating shaft, said sleeve rotating with the driven shaft, automatic means for urging the sleeve in a direction longitudinally of the driven shaft to maintain the sleeve in operative connection with the operating shaft, and means for rendering said driven shaft inoperative.

7. The combination with a transporting vehicle having a movable load carrier, an operating shaft therefor, and a gear fixed to said shaft; of a structure upon which the movable load carrier is adapted to discharge, a driven shaft carried by the structure, a second shaft having universal connection with the driven shaft, a sleeve keyed to said second shaft and movable longitudinally thereof, a gear carried by the sleeve and engageable with the gear of the operating shaft, automatic means coacting with the sleeve for urging the same in one direction, and means carried by the structure and coacting with the sleeve to move the sleeve to bring the gear of the sleeve into engagement with the gear of the operating shaft.

8. The combination with a transporting vehicle having a movable load carrier, an operating shaft therefor, and a gear fixed to said shaft; of a structure upon which the movable load carrier is adapted to discharge, a driven shaft carried by the structure, a second shaft having universal connection with the driven shaft, a sleeve keyed to said second shaft and movable longitudinally thereof, a gear carried by the sleeve and engageable with the gear of the operating shaft, a contractile spring carried by the second shaft, and means carried by the structure and coacting with the sleeve to move the sleeve to bring the gear of the sleeve into engagement with the gear of the operating shaft.

In testimony whereof I hereunto affix my signature in the presence of two witnesses.

LUDVIG B. PIERSON.

Witnesses:
 BERT E. KINDE,
 G. R. DRURY.